United States Patent [19]

Lassanske

[11] 4,175,632
[45] Nov. 27, 1979

[54] DIRECT CURRENT MOTOR DRIVEN VEHICLE WITH HYDRAULICALLY CONTROLLED VARIABLE SPEED TRANSMISSION

[76] Inventor: George G. Lassanske, 1303 Riverdale Dr., Oconomowoc, Wis. 53066

[21] Appl. No.: 789,797

[22] Filed: Apr. 22, 1977

[51] Int. Cl.² .................................................. B60K 25/10
[52] U.S. Cl. .................................................. 180/65 R
[58] Field of Search ............... 180/65 R, 65 C, 65 D, 180/65 E; 303/3; 318/139, 371; 74/208

[56] References Cited

U.S. PATENT DOCUMENTS

| | | | |
|---|---|---|---|
| 3,202,234 | 8/1965 | Osborne | 180/65 E |
| 3,424,260 | 1/1969 | Stone et al. | 180/65 R X |
| 3,424,261 | 1/1969 | Sheldon | 180/65 R X |
| 3,818,293 | 6/1974 | Wood | 180/65 R X |
| 4,024,926 | 5/1977 | Butoi | 180/65 D |

*Primary Examiner*—Joseph F. Peters, Jr.
*Assistant Examiner*—Gene A. Church

[57] ABSTRACT

Disclosed herein is a vehicle comprising a frame, a drive wheel supported by the frame, a direct current motor supported by the frame, a drive train connecting the direct current motor and the drive wheel and including a variable speed "V" belt drive with a rotatably carried pulley including a non-axially movable sheave and an axially movable sheave, and a spring biasing the axially movable sheave away from the non-axially movable sheave, a hydraulic circuit for regulating the axial position of the axially movable sheave and including a pump driven by the motor, a hydraulic cylinder piston assembly in communication with the pump and mechanically connected to the axially movable sheave for applying a force urging the axially movable sheave toward the non-axially movable sheave, and a control for regulating the pressure of the fluid in the hydraulic cylinder piston assembly to regulate the axial force applied to the axially movable sheave.

9 Claims, 2 Drawing Figures

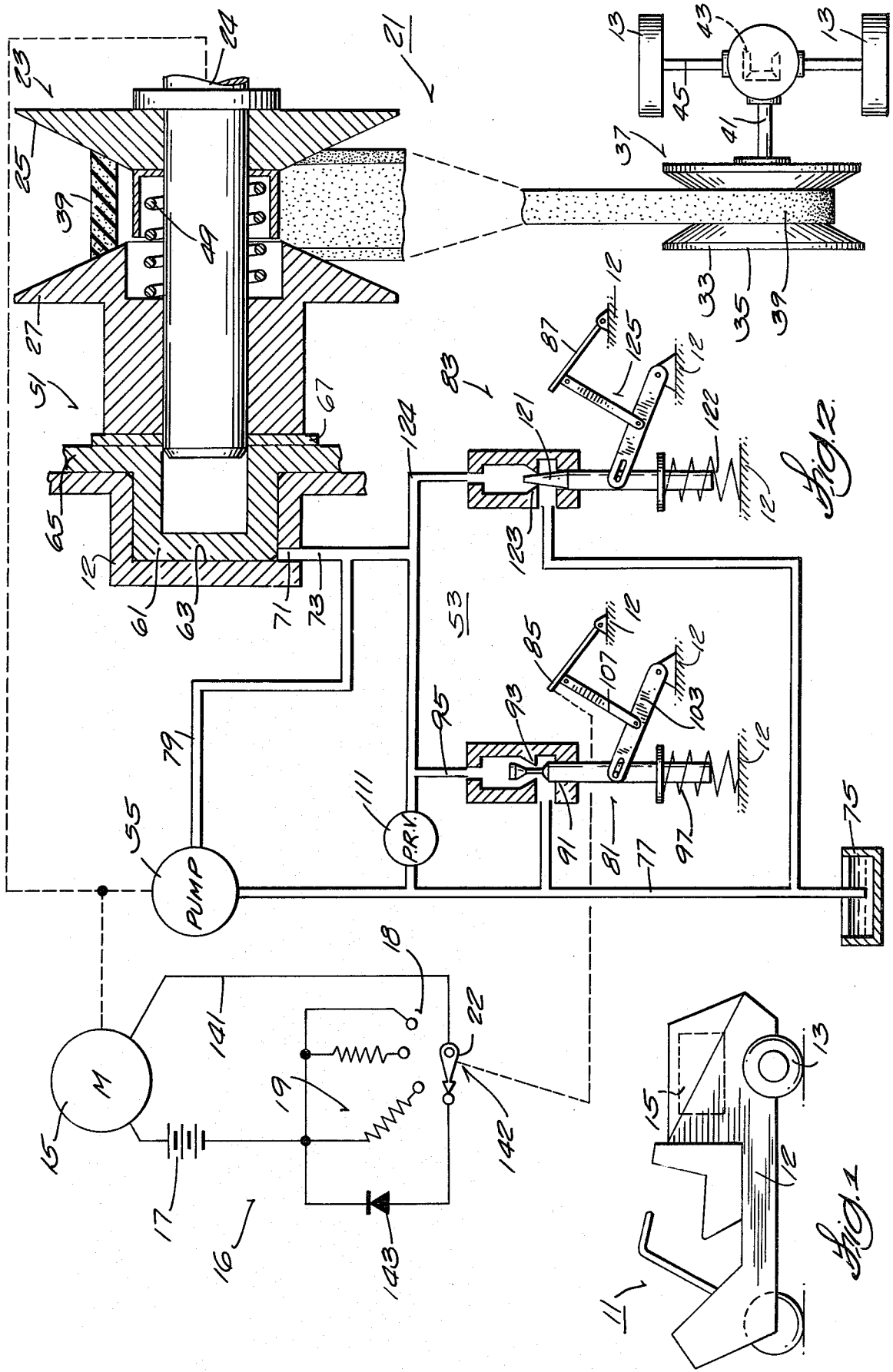

DIRECT CURRENT MOTOR DRIVEN VEHICLE WITH HYDRAULICALLY CONTROLLED VARIABLE SPEED TRANSMISSION

BACKGROUND OF THE INVENTION

The invention relates generally to speed control arrangements for electrically powered vehicles such as, for instance, golf carts and light industrial vehicles. In particular, the invention relates to speed controlling arrangements for battery powered electrically driven vehicles including direct current motors.

In the past, some electrically driven vehicles have included direct current motors which have been connected to the drive wheels through direct drive arrangements, such as a "V" belt drive. In such arrangements, the vehicle speed was controlled by varying the voltage applied to the motor, either by selectively inserting and withdrawing resistors in the motor circuit or by differentially connecting the batteries to the motor. These arrangements permitted limited variation in speed at incrementally spaced levels, but were either energy wasteful or involved relatively complicated switching devices.

In at least one prior vehicle, a direct current electric motor was connected to the drive wheels through a variable speed "V" belt drive. However, speed control was provided by control of the voltage applied to the motor. As in the prior vehicles including a direct drive from the motor to the drive wheels, speed could be incrementally varied and the control arrangement was either energy wasteful or included relatively expensive switching arrangements for the batteries.

In other prior vehicles, internal combustion engines were employed as the prime mover, which internal combustion engines were connected to the drive wheels through variable speed "V" belt drives. In these vehicles, vehicle speed was controlled by regulating the engine throttle and a generally continuous and infinite speed control was provided.

Infinite speed control can also be obtained in a direct current motor by employing a potentiometer arrangement for infinitely varying the amount of resistance employed in series with the motor. However, such arrangements are both expensive and energy inefficient. Thus, while infinite control of vehicle speed has been available in internal combustion engine driven vehicles, such infinite and continuous speed control has not been economically available in electrically powered vehicles.

SUMMARY OF THE INVENTION

The invention provides a vehicle comprising a frame, a drive wheel supported by the frame, a direct current motor supported by the frame, a drive train connecting the direct current motor and the drive wheel and including a variable speed "V" belt drive with a rotatably carried pulley including a non-axially movable sheave and an axially movable sheave, and means biasing the axially movable sheave away from the non-axially movable sheave, a hydraulic circuit for regulating the axial position of the axially movable sheave and including a pump driven by the motor, hydraulic cylinder piston means in communication with the pump and mechanically connected to the axially movable sheave for applying a force urging the axially movable sheave toward the non-axially movable sheave, and control means for regulating the pressure of the fluid in the hydraulic cylinder piston means to regulate the axial force applied to the axially movable sheave.

In one embodiment in accordance with the invention, the control means comprises a valve communicable with the pump and including a member movable between opened and closed position to regulate the pressure of the fluid in the cylinder piston means, means biasing the valve member toward the open position, and regulating means for operating the valve member against the action of the spring.

In one embodiment in accordance with the invention, the regulator means comprises an acceleration controller movably mounted on the frame, and a linkage connecting the controller to the valve member so as to locate the acceleration controller in a non-accelerating position in response to action of the valve biasing means and so as to afford displacement of the valve member from the open position against the action of the valve biasing means.

In one embodiment in accordance with the invention, the vehicle further includes at least one battery on the frame, and an electrical circuit electrically connecting the battery to the motor and including an "off-on" switch mechanically connected to the acceleration controller so as to electrically disconnect the battery from the motor when the valve member is closed in response to the action of the valve biasing means.

In one embodiment in accordance with the invention, the electrical circuit includes a shunt line bridging the "off-on" switch and including a second switch operable between open and closed positions, and means for restricting current in the shunt line to flow in the direction opposite to such flow as is effective to operate the motor from the battery, and means for closing the second switch in response to the movement of the acceleration controller to the non-accelerating position.

In one embodiment in accordance with the invention, the hydraulic circuit includes a second valve communicating with the pump in parallel with the first valve and including a member movable between opened and closed positions to regulate the pressure of the fluid in the cylinder piston means, means biasing the second valve member toward the closed position, and a second regulating means for operating the second valve member against the action of the second valve biasing means.

In one embodiment in accordance with the invention, the second regulating means comprises a brake controller movably mounted on the frame, and a second linkage connected to the second valve member and to the brake controller so as to locate the brake controller in a non-braking position in response to action of the second valve biasing means and so as to afford displacement of the second valve member from the closed position against the action of the second valve biasing means.

One of the principal features of the invention is the provision of a vehicle driven by a direct current motor and including a variable speed V-belt drive including a hydraulically actuated control affording continuous and infinite speed variation.

Another of the principal features of the invention is the provision of a direct current motor driven vehicle including a variable speed V-belt drive and means for charging the batteries in response to an over-running of the drive pulley of the variable speed drive.

Other features and advantages of the embodiments of the invention will become known by reference to the following general description, appended claims and attached drawings.

THE DRAWINGS

FIG. 1 is a schematic perspective view of a vehicle incorporating various of the features of the invention.

FIG. 2 is a schematic view partially broken away and in section of various of the components included in the vehicle shown in FIG. 1.

Before explaining the embodiments of the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown in FIG. 1 is a vehicle 11 which includes a frame 12 and one or more drive wheels 13 which are driven by a direct current electric motor 15 connected to the drive wheel or wheels 13, as schematically shown in FIG. 2, through a variable speed "V" belt drive or transmission 21 which, preferably, is torque sensitive. More particularly, the motor 15 can be energized through a circuit 16 which includes one or more batteries 17 connected in series with the motor 15 and with an "off-on" switch 18 which includes a switch controller 22 and which is connected to and operated by an acceleration controller which can be in the form of an accelerator pedal 85. As desired, variable resistance means 19 can also be included in series with the motor 15 or switch means (not shown) can be provided for variably connecting one or more of the batteries 17 to the motor 15 to vary the applied voltage. The variable resistance means 19 is preferably operated by another controller (not shown) which can also operate the "off-on" switch 18 or can operate separately from the "off-on" switch 18. However, it is emphasized that the ability to vary the applied voltage is not the primary mechanism disclosed herein for speed control.

The variable speed "V" belt drive 21 is generally of conventional construction and includes a driving pulley 23 which is mounted on a drive shaft 24 rotated or driven by the motor 15 and which includes an axially stationary sheave 25 and an axially movable sheave 27. In addition, the variable speed "V" belt drive 21 includes a driven pulley 33 including an axially stationary sheave 35 and an axially movable sheave 37, together with a "V" belt 39 which connects the pulleys 23 and 33. The driven pulley 33 is suitably connected to an output shaft 41 which, in turn, is connected by a pair of bevel gears 43 to a drive axle 45 which, in turn, is connected to the drive wheels 13.

The variable speed "V" belt drive or transmission also includes means in the form of a spring biasing at least one of the movable sheaves toward a position establishing the drive in a "low gear" condition. Thus, in the illustrated construction, the driving pulley 23 includes a spring 49 biasing the axially movable sheave 27 away from the axially stationary sheave 25 to a spaced position providing "low gear" operation of the drive 21.

In the construction disclosed herein, continuous and infinite speed variation is provided by controlling the location of the axially movable sheave of one of the driving or driven pulleys 23 and 33. In the illustrated construction, the axially movable sheave 27 of the driving pulley 23 is controlled. For the purposes of the following description, it will be assumed that the motor 15 is supplied current at a constant potential.

Control of the location of the axially movable sheave 27 is provided by a cylinder piston arrangement 51 which is connected in a hydraulic circuit 53 including a hydraulic pump 55 which is rotated or driven by the motor 15.

Any suitable cylinder-piston arrangement 51 can be connected to the axially movable sheave 27 to controllably effect displacement thereof. In the illustrated construction, the movable sheave is mounted on the shaft 24 for common rotation and for movement axially thereof and is suitably connected to an axially movable piston 61 for common axial movement and for relative rotation therebetween. The piston 61 is axially movable in a cylinder 63 which is suitably provided on the frame 12. Variation in the quantity of hydraulic fluid contained in the space between the piston 61 and the cylinder 63 affords movement of the piston 61 axially of the cylinder 63. In order to obtain movement of the sheave 27 in common with the piston 61 while affording relative rotation therebetween, the piston 61 includes a thrust flange 65 which bears against a bearing plate or washer 67 which is connected to the sheave 27 so as to provide relative rotation between the piston 61 and the axially movable sheave 27 while also transmitting axial thrust to the sheave 27 from the cylinder piston arrangement 51 to effect axial movement of the movable sheave 27 in response to variation in the quantity of fluid in the space between the cylinder 63 and the piston 61. In this last regard, the cylinder 63 includes a fitting 71 providing communication between the interior of the cylinder 63 and a hydraulic line 73 which forms a part of the hydraulic circuit 53. If desired, a rotating hydraulic coupling could be employed with a rotatable cylinder-piston arrangement.

The pump 55 draws hydraulic fluid from a sump or reservoir 75 through a line 77 and delivers hydraulic fluid back to the sump 75 through a line 79 which includes one or more control valves which can be suitably constructed and actuated. In the illustrated construction, two control valves 81 and 83 are arranged in parallel relation to each other and are respectively actuated by a movably mounted accelerator pedal or controller 85 and a movably mounted brake pedal or controller 87. In the illustrated construction, the accelerator pedal 85 and brake pedal 87 are pivotally mounted from the vehicle frame 12.

While various valve constructions can be employed, in the illustrated construction, the valve 81 constitutes a needle valve including a needle member 91 which is suitably guided by means (not shown) on the frame for axial movement relative to an orifice 93 in a branch 95 in the line 79 and which is biased toward a position opening the orifice 93 by any suitable means such as the schematically illustrated compression spring 97.

The needle member 91 is connected to the accelerator pedal 85 by a suitable linkage 101 which includes a link 103 which is pivotally mounted at one end thereof on the vehicle frame 12, which is pivotally and slidably connected at the other end thereof, to the needle member 91, and which is pivotally connected, intermediate the ends thereof, to one end of a link 107 which, in turn, is pivotally connected, at its other end, to the accelerator pedal 85 at a point remote from the pivotal mounting thereof to the vehicle frame 12. Thus, the spring 97 serves, in addition to urging the needle member 91 towards the open position, to urge the accelerator pedal 85 toward an elevated or non-accelerating position. Accordingly, depression of the accelerator pedal 85 causes opening of the control valve 81.

The hydraulic circuit 53 also includes a pressure relief valve 111 which by-passes the control valve or valves 81 and 83 and which is operative to return to the sump such fluid which is about a predetermined pressure. In addition, the hydraulic line 73 leading from the cylinder piston arrangement 51 is connected to the line 79 intermediate the pump 55 and the control valve 81. Thus, the fluid pressure in the line 79 upstream of the valve 81 is available in the cylinder piston arrangement 51 to axially locate the movable sheave 27 against the loading encounted thereby. If desired, the cylinder piston arrangement 51 could be connected in the hydraulic circuit 53 so that the fluid flow from the pump 55 to the sump 75 would pass through the cylinder piston arrangement 51 as distinguished from the illustrated construction.

As thus far described, the pump 55 will rotate at a speed proportional to motor speed and accordingly, will develop pressure in accordance with motor speed. The pressure available in the cylinder piston arrangement 51 will be controlled by the setting of the control valve 81. Thus, at the extremes, when the accelerator pedal 85 is fully raised by action of the spring 97, the needle valve member 91 will fully open the orifice 93, thereby permitting relatively unrestricted flow therepast and limiting the pressure level in the cylinder piston assembly 51 to a relatively low level which is ineffective to overcome the action of the spring 49, thereby providing "low gear" operation.

When the accelerator pedal 85 is fully depressed, the needle valve member 91 closes the orifice 93, thereby permitting the pump 55 to deliver full pressure to the cylinder piston assembly 51, subject only to the relief afforded by the relief valve 111. As a consequence, the movable sheave 27 will be urged toward the axially stationary sheave 25 and against the bias of the spring 49 by a relatively high force associated with the pressure developed in the line 79, i.e., in accordance with the output of the pump 55.

Accordingly, the drive ratio of the variable speed "V" belt drive or transmission 21 can be continuously and infinitely varied by controlling the pressure level at the piston cylinder assembly 51 by varying the location of the needle valve member 91 so as thereby to provide speed control, notwithstanding the application of constant voltage to the motor 15. Thus, speed control is available without recourse to energy wasteful resistors or relatively complicated arrangements for differentially connecting a series of batteries to the motor 15 so as to vary the applied potential.

When the accelerator pedal 85 is released, i.e., returns to the fully elevated position, the motor is electrically disconnected, i.e. the "off-on" switch 18 is opened, and the spring 49 biases the axially movable sheave 27 away from the axially stationary sheave 25, i.e., to the "low gear" position. Assuming that the vehicle 11 is still in motion, vehicle movement will, through the transmission, drive the de-energized motor to re-charge the batteries, i.e., the speed of the vehicle 11 in effect drives the motor 15 to cause charging of the batteries. In this regard, if the motor is driven by the transmission 21 at a speed higher than the speed generated by the motor for a given applied voltage, a back EMF will develop, which EMF will overcome the applied voltage and will re-charge the batteries.

Increased regenerative action can be obtained by employing the second control valve 83 in parallel with the first control valve 81 and by actuating the second control valve 83 by the brake pedal 87. While any suitable valve construction can be employed, in the illustrated construction, the valve 83 is, except for being normally closed instead of normally open, of generally the same construction as the control valve 81 and includes a needle member 121 which is biased by a spring 122 toward a position closing an orifice 123 in a branch 124 arranged in parallel with the branch 95 in the line 79. Control of the needle valve member 121 by the brake pedal 87 is achieved by a linkage 125 which can be constructed in the same way as the linkage 101. Thus, the brake pedal 87 is normally biased upwardly by the spring 122 to a non-braking position and upon application of force to the brake pedal, the needle valve member 121 opens the orifice 123, thereby further easing flow of the fluid from the pump 55 to the sump 75, and thereby assisting in preventing build-up of pressure in the cylinder piston assembly 51. Accordingly, the movable sheave 27 of the driving pulley 23 will be located by the spring 49 in the most remote position from the non-axially movable sheave 25, i.e., in the "low gear" position. It is particularly noted that in this position, and in response to vehicle movement, the drive shaft 24 of the driving pulley 23 rotates at a faster speed than the output shaft 41 of the driven pulley 33. As a consequence, the motor 15 will be driven by the vehicle 11 to re-charge the batteries.

In order to re-charge the battery or batteries 17 when the battery circuit 16 to the motor 15 is opened when the accelerator pedal 85 is in the fully raised position, there is provided a by-pass or shunt line 141 communicating between the batteries 17 and the electric motor 15 in parallel with the "off-on" switch 18 or in parallel with both the "off-on" switch 18 and the variable resistance 19. The line 141 includes a second "off-on" switch 142 actuated by the switch controller 22 and a diode 143 which prevents flow from the batteries 17 to the electric motor 15 while permitting flow from the electric motor 15 to the batteries 17. While the shunt line 141 could be electrically connected between the motor 15 and the batteries 17 by various means, in the illustrated construction, the line 141 is electrically connected between the batteries 17 and the electric motor 15 by closing the switch 142 simultaneously with opening of the "off-on" switch 18 by the operation of the controller 22 in response to movement of the accelerator pedal 85 to the fully raised position.

Various of the features of the invention are set forth in the following claims.

What is claimed is:

1. A vehicle comprising a frame, a drive wheel supported by said frame, a direct current motor supported by said frame, a drive train connecting said direct current motor and said drive wheel and including a variable speed "V" belt drive with a rotatably carried pulley including a non-axially movable sheave and an axially movable sheave, and means biasing said axially movable sheave away from said non-axially movable sheave, a hydraulic circuit for regulating the axial position of said axially movable sheave and including a pump driven by said motor, hydraulic cylinder piston means in communication with said pump and mechanically connected to said axially movable sheave for applying a force urging said axially movable sheave toward said non-axially movable sheave, and control means for regulating the pressure of the fluid in said hydraulic cylinder piston means to regulate the axial force applied to said axially movable sheave.

2. A vehicle in accordance with claim 1 wherein said control means comprises a valve communicable with said pump and including a member movable between opened and closed position to regulate the pressure of the fluid in said cylinder piston means, means biasing said valve member toward the open position, and regulating means for operating said valve member against the action of said spring.

3. A vehicle in accordance with claim 2 wherein said regulator means comprises an acceleration controller movably mounted on said frame, and a linkage connecting said controller to said valve member so as to locate said acceleration controller in a non-accelerating position in response to action of said valve biasing means and so as to afford displacement of said valve member from said open position against the action of said valve biasing means.

4. A vehicle in accordance with claim 3 and further including at least one battery on said frame, and an electrical circuit electrically connecting said battery to said motor and including an "off-on" switch.

5. A vehicle in accordance with claim 4 wherein said acceleration controller is connected to said "off-on" switch so as to electrically disconnect said battery from said motor when said valve member is opened in response to the action of said valve biasing means.

6. A vehicle in accordance with claim 4 wherein said electrical circuit includes a shunt line bridging said "off-on" switch and including a second switch operable between open and closed positions, and means for restricting current to flow in said shunt line in the direction opposite to such flow as is effective to operate said motor from said battery, and means for closing said second switch in response to the movement of said acceleration controller to the non-accelerating position.

7. A vehicle in accordance with claim 2 wherein said hydraulic circuit includes a second valve communicating with said pump in parallel with said first valve and including a member movable between opened and closed positions to regulate the pressure of the fluid in said cylinder piston means, means biasing said second valve member toward said closed position, and a second regulating means for operating said second valve member against the action of said second valve biasing means.

8. A vehicle in accordance with claim 7 wherein said second regulating means comprises a brake controller movably mounted on said frame, and a second linkage connected to said second valve member and to said brake controller so as to locate said brake controller in a non-braking position in response to action of said second valve biasing means and so as to afford displacement of said second valve member from said closed position against the action of said second valve biasing means.

9. A vehicle comprising a frame, a drive wheel supported by said frame, a direct current motor supported by said frame, a drive train connecting said direct current motor and said drive wheel and including a variable speed "V" belt drive with a rotatably carried pulley including a non-axially movable sheave and an axially movable sheave, and means biasing said axially movable sheave relative to said non-axially movable sheave, a hydraulic circuit for regulating the axial position of said axially movable sheave and including a pump driven by said motor, hydraulic cylinder piston means in communication with said pump and mechanically connected to said axially movable sheave for applying a force urging said axially movable sheave against the action of said biasing means, and control means for regulating the pressure of the fluid in said hydraulic cylinder piston means to regulate the axial force applied to said axially movable sheave.

* * * * *

UNITED STATES PATENT AND TRADEMARK OFFICE
CERTIFICATE OF CORRECTION

PATENT NO. : 4,175,632
DATED : November 27, 1979
INVENTOR(S) : George G. Lassanske It is certified that error appears in the above-identified patent and that said Letters Patent are hereby corrected as shown below:

On the title page after line [76], insert the following:

[73] Assignee: Outboard Marine Corporation, Waukegan, Illinois

Signed and Sealed this

Twenty-second Day of July 1980

[SEAL]

Attest:

SIDNEY A. DIAMOND

Attesting Officer

Commissioner of Patents and Trademarks